June 24, 1969  R. J. O'HAIR  3,451,165

DECORATIVE SHUTTERS AND METHODS OF ASSEMBLY

Filed Nov. 2, 1967

INVENTOR
Roy J. O'Hair
BY Wofford & Felsman
ATTORNEYS

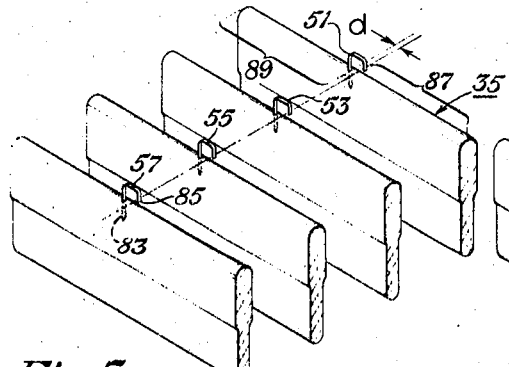
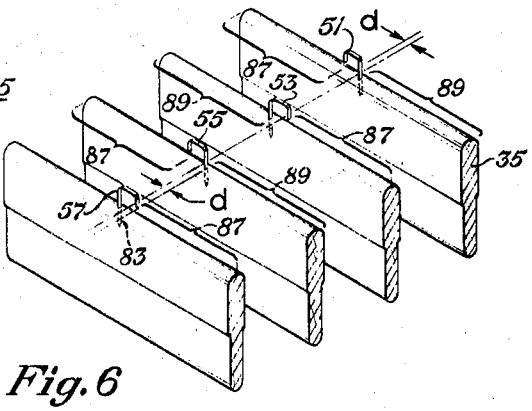
Fig. 5  Fig. 6
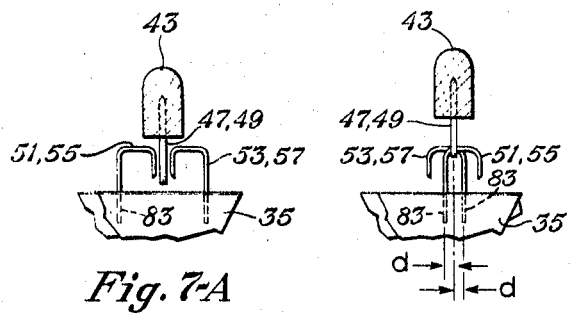
Fig. 7-A  Fig. 7-B  Fig. 8
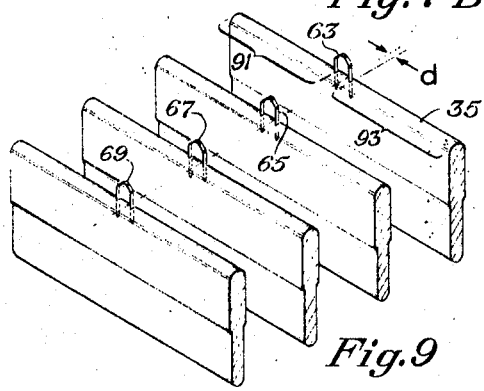
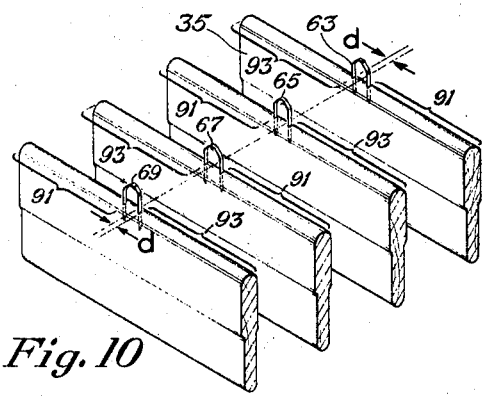
Fig. 9  Fig. 10
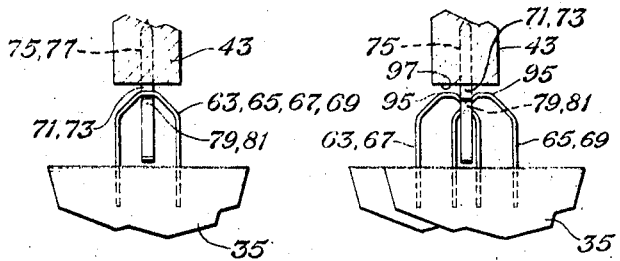
Fig. 11  Fig. 12  Fig. 13

United States Patent Office 3,451,165
Patented June 24, 1969

3,451,165
DECORATIVE SHUTTERS AND METHODS OF ASSEMBLY
Roy J. O'Hair, 2313 58th St., Lubbock, Tex. 79412
Filed Nov. 2, 1967, Ser. No. 680,180
Int. Cl. E06b 9/02
U.S. Cl. 49—87                         10 Claims

ABSTRACT OF THE DISCLOSURE

A shutter which accommodates a wide variety of interchangeable decorative insert panels through utilization of a construction having a frame with side stiles and top and bottom rails, the side stiles having vertical slots formed along the length of their inner edges. Into at least one of these slots is inserted a compressible element such as a resilient strip. A decorative insert such as a panel of plastic, glass or tiltable louvers may be inserted into the frame by compressing the resilient strip. Also disclosed is an apparatus and method of constructing a tiltable louver panel such that the louvers are individually removable after assembly. The utilization of the above-mentioned compressible element enables the use of louver retaining strips which may be spread sufficiently to remove one or all of the individual louvers. A method for assembling the louver retaining strips, louvers, and a tilt rod for controlling angular orientation of the louvers is disclosed wherein hooks and eyes on the louvers and tilt rod are staggered to enable rapid and convenient assembly, and simultaneously, the prevention of inadvertent disengagement of one of the louvers.

Background and general discussion

In the industry concerned with decorative treatment of windows it has been previously considered desirable to provide a variety of shutter designs. Such designs include the use of conventional louver construction, with the louvers being tiltable to control the amount of light and privacy. In addition, it is a common practice to provide shutters having inserts of plastic, fabric and other decorative materials. The decorative panels are generally not interchangeable with the frames, a fact which requires duplication of inventories by the trade and which greatly restricts the flexibility of decorating possibilities by the consumer. It is my purpose to provide a shutter frame which will accommodate a wide variety of interchangeable, decorative insert panels such as louvered panels, plastic panels, fabric panels, decorative stamped panels or others.

Previously known louvered shutter panels with which I am familiar are permanently assembled as a unit and have the disadvantage that the individual louvers are not conveniently replaceable. Consequently, if one louver is damaged, it may be prohibitively expensive or inconvenient to replace. Moreover, the sanding and finishing of the louvered shutters is difficult due to the many inaccessible areas found in the assembled units. It is accordingly my purpose to provide a louver insert panel which enables individual replacement of louvers to simplify repair and finishing.

Another purpose is providing individually removable louvers is to enable automated assembly of the various components at one single stage in the manufacturing process. It is common in the construction of louvered shutters to rely on a series of subassemblies leading to a final assembly of all the components, this technique being necessarily inefficient. I have originated therefore a method of assembling the individual louvers utilizing a plurality of hooks and eyes on the respective louvers and tilt rods such that the hooks may be mechanically threaded into the eyes and secured thereto without fear of inadvertent separation, and without necessity for bending the hooks to confine the eyes. Moreover, my method utilizes lateral staggering of either the hooks or the eyes to simplify and speed threading of the hooks and the eyes upon assembly. It is therefore one of my purposes to provide improved methods of assembling louvers in a decorative, tiltable louver panel.

Brief description of the figures of the drawings

FIGS. 5 through 8 illustrate steps in a method of assembling individually removable louvers with a tilt rod; and FIGS. 9 through 13 illustrate steps in an alternate method of asembling such louvers with tilt rods.

Description of a preferred embodiment

Figure 1:
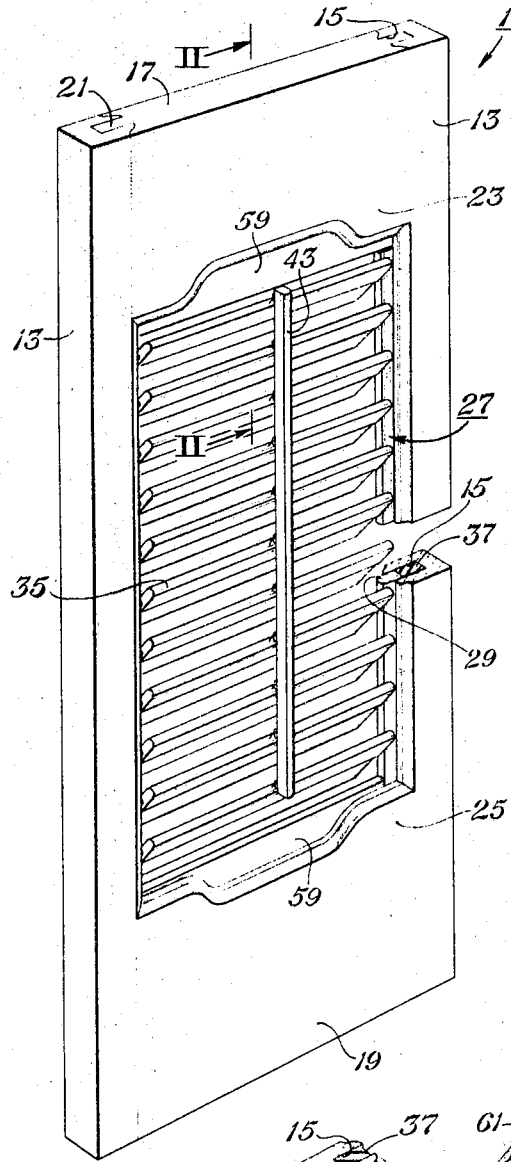
FIG. 1 is a perspective view of a shutter having a tiltable louver insert panel constructed in accordance with the principles of my invention.

Numeral 11 in the drawing designates a generally rectangular frame which includes side stiles 13 having vertical slots 15 formed along their inner edges. The side stiles are joined by top and bottom rails 17, 19 which are tenoned as indicated by the numeral 21 to be received in the slots 15. The top and bottom rails have walls designated respectively by the numerals 23, 25 that are formed on a front side of the vertical slots 15 in the side stiles to extend further than the remainder of the rail to form a decorative valance.

Figure 3:
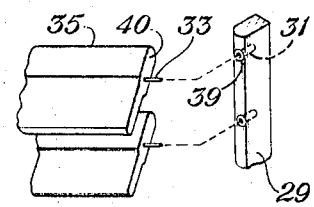
FIG 3 is an exploded and fragmentary perspective view showing portions of louvers, louver retaining strip, and a pivotal mounting technique used in a preferred construction.

A louvered insert panel is designated by the numeral 27 in the drawing and includes louver retaining strips 29 having a plurality of equally spaced holes 31 (as shown in FIG. 3) which receive the tenons 33 of the individual louvers 35. Consequently, the louvers are horizontally tiltable. As shown in FIG. 1, the louver retaining strips 29 are inserted into the slots 15, each of which includes a compressible element 37 which in this instance is in the form of a resilient strip of material extending along the length of the louver retaining strip to exert a uniform inward pressure. The holes 31 each receive an eyelet 39 having an inner edge that protrudes beyond the edge of the louver retaining strip to form a bearing surface which engages the opposed shoulder 40 of an associated louver. The uniform pressure exerted by the louver retaining strip against the louver, caused by the compressible element 37, maintains the louvers in any selected position. In other words, the louver will not fall due to the force of gravity to a closed position if once opened a selected degree. In addition, the utilization of tenons 33 and metal eyelets 39 produces a smooth tilting or pivoting action of the louvers.

Figure 2:
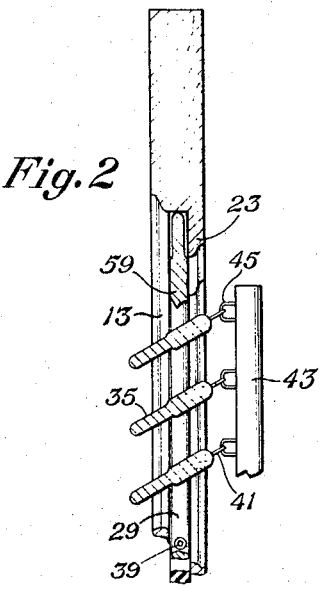
FIG. 2 is a fragmentary cross sectional view as seen looking along the lines II—II of FIG. 1.

As seen in FIG. 2, hooks 41 are secured on respective front edges of the louvers, and in addition, a tilt rod 43 has a plurality of equally spaced eyes 45 which are removably linked to the hooks on the louvers. The term "front edge" refers to the edge facing the tilt rod. The tilt rod enables control over the angular orientation of the louvers, and the utilization of open hooks 41 permits removability of individual louvers.

With reference to FIGS. 7 and 8, the eyes 47, 49 of the tilt rod 43 are in vertical alignment and open laterally, as shown. The hooks 51 through 57 on the louvers are laterally staggered in two vertical rows, after assembly as shown in FIG. 7-B. Each row has at least two hooks, with the hooks being threaded outwardly through the eyes of the tilt rod as shown in FIGS. 7–B and 8. Utilization of the above structure enables individual removability of selected louvers by movement of the louver retaining strip 29 against the compressible element 37. A light trap strip 59 (see FIG. 2) is secured into holes 31 in the louver retaining strips 29 to prevent entrance of light between the upper and lower louvers and the walls 23, 25 forming the decorative valances.

Figure 4:
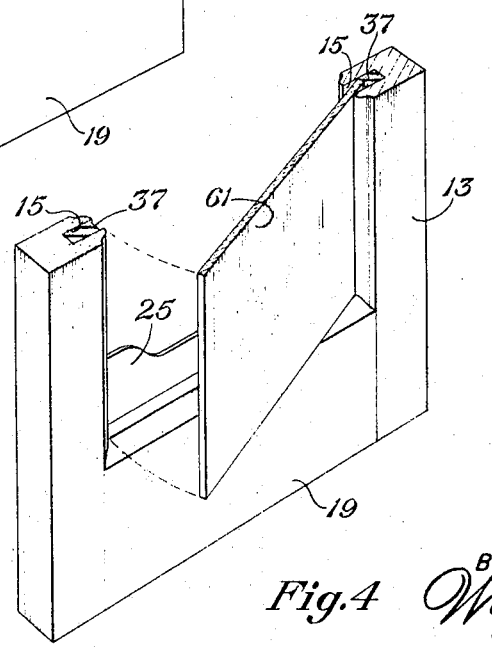
FIG. 4 is a fragmentary perspective view of a shutter frame constructed identically to the shutter frame of FIG. 1 but including a rigid decorative panel.

Utilization of the above structure enables the removal of the entire louver insert panel 27 and the insertion of an alternate form of decorative panel such as the rigid panel of plastic 61 illustrated in FIG. 4. The individual decorative panels are inserted by forcing one edge against one compressible element 37 until the opposite edge of the panel can clear the inner edge of the opposite side stile and be inserted into the opposite slot 15. To insure that the panel does not inadvertently fall from the slots, it is preferable to have compressible elements 37 in both slots 15. The insert panel 61 should have a width greater than the inside width of the frame but not exceeding the inside width of the frame plus the depth of one slot 15.

An alternate form of my invention that relates to the assembly of the louvers with the tilt rod is shown in FIGS. 9 through 13. Here, a plurality of eyes 63 through 69 are inserted on respective front edges of the louvers as shown. In addition, a plurality of hooks 71, 73 have their shank ends 75, 77 embedded in the tilt rod and their open ends 79, 81 facing in the same direction. As shown in FIG. 13, the hooks 71, 73 of the tilt rod 43 are in vertical alignment and hook vertically in the same direction. Moreover, the eyes 63 through 69 (see FIG. 12) are open vertically and are laterally staggered in two vertical rows, each of which has at least two eyes, with the hooks of the tilt rod being threaded vertically through the eyes as shown in FIGS. 12 and 13.

The louvered panel described in connection with FIGS. 5 through 8 enables utilization of a method which eliminates necessity for subassembly of components. This method may be accomplished by hand but lends itself to mechanical automation and comprises the step of first inserting laterally extending hooks 51 through 57 into the front edge of respective louvers 35 (see FIG. 5). The hooks each have a shank end 83, as indicated on hook 57 in FIG. 5, inserted into a louver and an open end 85 as shown. The shank ends 83 are inserted into the louvers slightly offset from the center, as indicated by the letter *d* in FIGS. 5 and 6, with the open end 85 of the hooks extending past the center of each louver. Thus each louver appears to have a short end 87 and a long end 89. Then the hooks are oriented such that at least two of the louvers have their short ends adjacent to the long ends of the remaining louvers, as shown in FIG. 6. The hooks 51, 55 are then spaced apart from hooks 53, 57 as shown in FIG. 7–A. Moreover, the eyes 47, 49 are inserted into the tilt rod 43 such that they form a vertically aligned row with their eyes opened laterally (see FIG. 8). The hooks of one row are threaded into the corresponding eyes of the tilt rod. Then the hooks of the remaining row are threaded into the remaining eyes (see FIGS. 7–A, 7–B, and 8). Finally, the ends of the louvers are confined by the louver retaining strips 29 to prevent unthreading of the hooks from the eyes.

As shown in FIG. 7–B the shank ends 83 of the hooks 51–57 prevent the eyes 47, 49 from moving laterally a distance great enough to permit unthreading and thus the eyes are captive by the hooks.

As shown in FIGS. 9 through 13, the above described method may be varied to utilize eyes 63 through 69 in the louvers and hooks 71, 73 in the tilt rods. The varied method comprises the step of inserting vertically aligned and vertically extending hooks 71, 73 into tilt rod 43. The hooks have shank ends 75, 77 embedded in the rod and their open ends 79, 81 facing the same direction. Vertically opened eyes 63–69 are inserted into the front edge of the louvers, being slightly offset a distance *d* (see FIGS. 9 and 10) but extending over the center of the louver to define a short end 91 and a long end 93 as shown in FIG. 9. Next the louvers are oriented such that their eyes are aligned (see FIG. 11) but with at least two of the louvers having their short ends 91 adjacent the long ends 93 of the remaining louvers as shown in FIG. 10. Finally the hooks are threaded through the eyes and the louvers then moved once again laterally to the position shown in FIG. 12 and confined to prevent unthreading. When the louvers are confined to their normal position as shown in FIG. 12, the crowns 95 of the eyes will bear against the inner surface 97 of the tilt rod, preventing the hooks from assuming disengaging positions.

It should be apparent from the foregoing that I have provided an invention having significant advantages. The utilization of a shutter construction as described above enables the use of a wide variety of interchangeable decorative insert panels such as the louver panel 27 shown in the FIG. 1 or the rigid panel 61 shown in FIG. 4. Interchangeability is possible in this instance through utilization of vertical slots 15 in the side stiles 13 of the frame, and insertion of a compressible element 37 which is preferably in the form of a resilient strip. Hence, the decorative panels may be conveniently interchanged. In addition, the individual louvers 35 in the louver panel 27 may be individually removed when repair is necessary and further simplifies sanding and finishing. The compressible element 37 exerts a uniform pressure against the tiltable louvers and maintains them in any selected position. The utilization of the eyelets 39 and the tenons 33 provides an improved bearing surface for the tilting action of the louvers. The methods described in connection with FIGS. 5 through 8 and FIGS. 9 through 13 enable mechanical automation of assembly through utilization of appropriate fixtures.

While I have shown my invention in only a few of its forms it should be apparent to those skilled in the art that it is not so limited but is susceptible to various changes and modifications without departing from the spirit thereof.

I claim:

1. A shutter frame which will accommodate a wide variety of interchangeable decorative insert panels, one of which contains a series of horizontally pivoted, tiltable louvers, comprising:
    a generally rectangular shutter frame having two side stiles with vertical slots formed along the inner edges, the side stiles being joined with top and bottom rails;
    a compressible element disposed in at least one vertical slot;
    two louver retaining strips having equally spaced holes along their inner edges and with their outer edges disposed in said slots, at least one of said two louver retaining strips engaging said compressible element;
    horizontaly tiltable louvers having a tenon extending from each end and inserted into selected holes on the inner edges of the louver retaining strips, whereby said louvers may be independently removable from the frame;
    a tilt rod linked to said louvers to control the angular orientation of the louvers.

2. The shutter frame defined by claim 1 in which the rails have a wall formed on a front side of the vertical slots in the side stiles that extends farther than the remainder of the rails to form a decorative valance.

3. The shutter frame defined by claim 1 in which the compressible element is a strip of resilient material that extends essentially the length of said vertical slot between said top and bottom rails to exert a uniform pressure against the outer edge of the louver retaining strip and thus against the shoulders of each louver to maintain any selected angular orientation.

4. The shutter frame defined by claim 1 in which the equally spaced holes of the louver retaining strips receive metal eyelets to support the tenons, the inner edge of said eyelets protruding beyond the inner edge of the louver strip to form bearing surfaces which engage shoulders of the louvers.

5. A shutter frame which will accommodate a wide variety of interchangeable decorative insert panels, one of which contains a series of horizontally pivoted, tiltable louvers which are individually removable, comprising:
- a generally rectangular shutter frame having two side stiles with vertical slots formed along the inner edges, the side stiles being joined with top and bottom rails;
- a compressible element disposed in at least one vertical slot;
- two louver retaining strips having equally spaced holes along their outer edges disposed in said slots, at least one of said two louver retaining strips engaging said compressible element;
- horizontally tiltable louvers having a tenon extending from each end and inserted into selected holes on the inner edges of the louver retaining strips whereby said louvers may be independently removable from the frame;
- hooks on respective front edges of the louvers;
- a tilt rod having equally spaced eyes which are removably linked to the hooks on the louvers to control the angular orientation of the louvers and permit removability of individual louvers.

6. The shutter frame defined by claim 5 in which the eyes of the tilt rod are in vertical alignment and open laterally; and the hooks on the louvers are laterally staggered in two vertical rows, each of which has at least two hooks, with the hooks in the rows being threaded outwardly through the eyes of the tilt rod.

7. A shutter frame which will accommodate a wide variety of interchangeable decorative insert panels, one of which contains a series of horizontally pivoted, tiltable louvers which are individually removable, comprising:
- a generally rectangular shutter frame having two side stiles with vertical slots formed along the inner edges, the side stiles being joined with top and bottom rails;
- a compressible element disposed in at least one vertical slot;
- two louver retaining strips having equally spaced holes along their inner edges and with their outer edges disposed in said slots, at least one of said two louver retaining strips engaging said compressible element;
- horizontally tiltable louvers having a tenon extending from each end and inserted into selected holes on the inner edges of the louver retaining strips, whereby said louvers may be independently removable from the frame;
- eyes on respective front edges of the louvers;
- a tilt rod having equally spaced hooks which are removably linked to the eyes on the louvers to control the angular orientation of the louvers and permits removability of individual louvers.

8. The shutter frame defined by claim 7 in which the hooks of the tilt rod are in vertical alignment to hook vertically in the same direction; and the eyes on the louvers are open vertically and laterally staggered in two vertical rows, each of which has at least two eyes, with the hooks in the tilt rod being threaded vertically through the eyes of the louvers.

9. A method of linking the tilt rod to the louvers of a tiltable louver insert panel for a shutter frame, said method comprising the steps of:
- inserting laterally extending hooks into the front edge of the louvers, said hooks having a shank end for insertion into the louvers and an open end;
- said shank ends being inserted into louvers slightly offset from the center of the louvers with the hook open end extending past the center of the louvers;
- orienting the louvers such that their hooks are laterally staggered in two vertical rows, each of which has at least two hooks, with the hook ends in each row facing inwardly;
- inserting vertically aligned and laterally opened eyes into a tilt rod;
- threading the hook ends of one row of hooks into respective tilt rod eyes;
- threading the hook ends of the remaining row of hooks into respective tilt rod eyes by lateral movement of the associated louvers toward alignment with the remaining louvers;
- confining the ends of the louvers to prevent unthreading of the hooks from the eyes.

10. A method of linking the tilt rod to the louvers of a tiltable louver insert panel for a shutter frame, said method comprising the steps of:
- inserting vertically aligned and vertically extending hooks in a tilt rod, said hooks having shank ends embedded in the rod and open ends facing in the same direction;
- inserting vertically opened eyes into the front edge of the louvers, said eyes being slightly offset but extending over the center of the louvers to define a short end and to define a large end of each louver;
- orienting the louvers such that their eyes are aligned but with at least two of the louvers having their short ends adjacent to the long ends of the remaining louvers;
- threading the hooks of the tilt rod into the eyes of the louvers;
- aligning and confining the ends of the louvers to prevent unthreading of the hooks from the eyes.

References Cited

UNITED STATES PATENTS

| | | | |
|---|---|---|---|
| 2,671,251 | 3/1954 | Etling | 49—417 |
| 2,694,840 | 11/1954 | Smith | 49—419 X |
| 2,761,185 | 9/1956 | Sherwood | 49—74 |
| 2,799,061 | 7/1957 | Hadary | 49—74 |
| 3,125,944 | 3/1964 | Radcliff | 49—51 |
| 3,180,246 | 4/1965 | Johnson | 49—90 X |
| 3,191,241 | 6/1965 | Johnson | 98—110 X |
| 3,324,785 | 6/1967 | Underdahl | 49—74 X |
| 3,336,698 | 8/1967 | MacGregor | 49—419 X |

DAVID J. WILLIAMOWSKY, *Primary Examiner.*

P. C. KANNAN, *Assistant Examiner.*

U.S. Cl. X.R.

98—121